United States Patent [19]

Britchi

[11] Patent Number: 4,842,750

[45] Date of Patent: Jun. 27, 1989

[54] APPARATUS FOR CLEANING VISCOUS MATERIALS

[76] Inventor: Lucian Britchi, Philipp-Weber Strasse 3, D-6457 Maintal 3, Fed. Rep. of Germany

[21] Appl. No.: 914,778

[22] Filed: Oct. 3, 1986

[30] Foreign Application Priority Data

Oct. 4, 1985 [DE] Fed. Rep. of Germany ....... 3535491

[51] Int. Cl.$^4$ ...................... B01D 29/02; B01D 33/04; B01D 37/04
[52] U.S. Cl. .................................... 210/791; 210/741; 210/107; 210/387; 210/399; 425/197
[58] Field of Search ............... 210/106, 107, 387, 399, 210/400, 407, 445, 741, 791, 138, 783; 425/197, 198, 199

[56] References Cited

U.S. PATENT DOCUMENTS

| | | | |
|---|---|---|---|
| 2,507,311 | 5/1950 | Lodge | 425/199 |
| 2,867,324 | 1/1959 | Hirs | 210/138 |
| 3,855,126 | 12/1974 | Smith | 210/387 |
| 3,940,335 | 2/1976 | Kalman | 210/387 |
| 4,159,953 | 7/1979 | Paquette | 210/396 |
| 4,318,677 | 3/1982 | Wrich et al. | 425/197 |
| 4,358,262 | 11/1982 | Herbert | 425/197 |
| 4,410,477 | 10/1983 | Claude | 425/197 |
| 4,486,304 | 12/1984 | Neuman et al. | 210/107 |

Primary Examiner—Richard V. Fisher
Assistant Examiner—Linda S. Evans
Attorney, Agent, or Firm—Davis Hoxie Faithfull & Hapgood

[57] ABSTRACT

The invention relates to an apparatus for cleaning viscous materials, more particularly melted down scrap synthetic materials in a recycling process. The apparatus of the invention comprises a cleaning screen in the form of a strip which can be moved at right angles to the direction of flow of the material to be cleaned, so that the soiled area of the screen may be replaced by a clean area. In order to prevent the synthetic material from escaping when the cleaning screen is advanced, the volume before the screen is enlarged. This reduces or eliminates the pressure upon the screen so that the strip can easily be displaced, with no escape of the viscous material from the gaps in which the cleaning screen is located.

30 Claims, 5 Drawing Sheets

APPARATUS FOR CLEANING VISCOUS MATERIALS

FIELD OF THE INVENTION

The invention relates to an apparatus for cleaning viscous materials, such as engine oils, honey and synthetic materials liquefied by heating.

BACKGROUND OF THE INVENTION

Cleaning processes play a particularly important role in the reconditioning of synthetic materials.

In the chemical industry, synthetic materials are initially produced in the form of powders and are then converted into granules to facilitate handling. These granules are placed on the market and are processed by the manufacturers of articles made of synthetic materials. The molten granules are shaped into tubes, foils and the like with the aid of extruders.

Since the granular materials produced by the chemical industry are relatively clean, there is generally no need for special cleaning prior to extrusion. However, if a very high degree of purity is required in the finished products, screens are inserted, even in the case of granules used for the first time, in order to eliminate possible impurities.

Cleaning synthetic raw materials is usually desirable when materials already used are to be reconditioned. Used synthetic foils, synthetic tubes and other objects made of synthetic materials, which are subjected to a so-called recycling process, must therefore usually be cleaned.

A cleaning process of this kind may consist, for example, in washing the articles, drying them, and passing them to a melting unit with a cleaning screen. The molten masses of synthetic materials are pressed through the cleaning screen which retains the impurities. After a certain length of time, the screen is soiled to such an extent that it must be replaced.

DESCRIPTION OF THE RELATED ART

Several screen-changing devices have already been proposed in order to facilitate the changing of screens (cf., for example, British Pat. No. 1,047,533). There are two main types: those which do not require the flow of molten material to be shut off while the screen is being changed, and those that require the molten material to be shut off for a short time while the screen is being changed.

In the case of the first type of screen-changing device, the flow of molten material is divided, during production, within the screen-change housing, into two ducts, each of which passes through a screening location, each consisting of a filter-pack and a support-plate arranged in a screen housing. In order to replace the screen, the screening location is moved out of the housing. The extended rear part seals off the flow-duct and production continues through the second screening location located in the housing. After a clean filter-pack has been inserted, the housing with the stop is returned to the flow of molten material. In the case of the second type of screen-changing device, the flow of molten material passes through one duct only and one screening location only. In order to change the screen the flow of molten material must be interrupted so that the screen housing and screening location can be withdrawn from the housing by means of a hydraulic cylinder.

A disadvantage associated with these known screen-changing devices is that the person operating the unit frequently finds it difficult to replace the dirty screen with a clean screen fast enough, since certain raw materials soil a screen approximately every 30 seconds.

For this reason, it has been proposed to replace individual screens, which must be replaced when they become dirty, with screens in the form of strips which are simply advanced when one section becomes dirty.

This, however, raises sealing problems since, each time the screen-strip is advanced, the jaws which clamp it in position must be released. However, this allows the molten synthetic material, which is under very high pressure, to escape to the outside through the resulting gaps. As a result of this, large amounts of synthetic material soon collect outside the apparatus.

In order to avoid unwanted squeezing out of fluids or the like, inflatable sealing tubes have been suggested. In the inflated condition, these bear, under pressure, upon both sides of the screen-strip (see U.S. Pat. No. 2,867,324). In the case of filtering devices for thermoplastic synthetic materials, where pressures of the order of 700 kp/cm$^2$ may arise, such rubber tube seals are however no longer applicable.

Another way of preventing viscous substances from escaping from a screen-unit to the outside is to adjust the temperature in the pressing device, at the passages in the screen-strip, while the unit is in operation, in such a manner that the substance to be filtered solidifies at these passages and forms sealing plugs (see German Pat. No. 1,611,132). However, the disadvantage of this is that it requires special cooling ducts and heating units.

In addition to this disadvantage is the fact that, in order to form sealing plugs in at least one of the passages, use is made of a sealing substance which differs from the substance to be filtered (see German Pat. No. 1,944,704), and this increases the cost of the whole sealing process.

According to another device, which is intended to facilitate movement of the screen-strip, this is accomplished by reducing the frictional forces instead of attempting to overcome them (see German Pat. No. 2,319,270). In this case, the screen arrangement is supported on the side facing the side of the screen-strip which is subjected to the pressure of the substance to be filtered, by a freely flowing medium, the pressure of which is dependent upon the pressure of the substance to be filtered through the screen-strip. In addition to this, the screen arrangement comprises at least one internal area into which the filtered substance from the screen-strip enters and which communicates with at least one duct for the purpose of carrying the filtered substance away. Although this eliminates one-sided pressure on the screen-strip by applying a corresponding counter pressure to the other side, it fails to solve the sealing problem.

According to another device, in which only a relatively small amount of force is needed to move the filter, without subjecting it to high internal stresses, a counter-support is provided. This is adapted to be moved back and forth, in the direction of displacement of the filter, by means of a drive (see German Pat. No. 2,343,353, U.S. Pat. Nos. 3,855,126, and 3,856,680). In this case, the movement of the counter-support is in parallel with the surface of the filter which, to a certain extent, assists in advancing the filter.

Finally, there is also a high pressure plastic recycling press in which it is possible to displace the support base axially for temporary clamping and subsequent release of the screen-strip combination (see U.S. Pat. No. 2,507,311, column 9, lines 60-64). This again makes no appreciable contribution in solving the sealing problem.

SUMMARY OF THE INVENTION

It is therefore an object of the invention, to provide a cleaning apparatus for viscous material which comprises a screen-strip, and in which the viscous material is prevented from escaping from the unit while the screen-strip is being advanced.

In accordance with the invention, there is provided an apparatus for cleaning viscous materials, comprising a cleaning screen in the form of a strip through which viscous material is pressed, the strip-shaped screen being movable crossways with respect to the direction of flow of the viscous material for replacement of a soiled area of the screen by a clean area, comprising means for increasing the volume in front of the strip-shaped screen where soiled viscous material is located, to provide a corresponding reduction of pressure of the viscous material against the strip-shaped screen when the latter is moved.

The advantage obtained according to the invention resides in that, as a result of a considerable decrease in the pressure of the material while the screen-strip is being advanced, the viscous material cannot escape through the gaps formed. As compared with known means for sealing the gaps, the apparatus according to the invention is not restricted to the use of substances which harden rapidly upon cooling. Instead, it is also possible to clean substances which do not harden over a wide range of temperatures.

BRIEF DESCRIPTION OF THE DRAWINGS

Further features and advantages of the invention will become more readily apparent from the following description of preferred embodiments as illustrated by way of examples in the accompanying drawings, in which.

DETAILED DESCRIPTION OF PREFERRED EMBODIMENTS

Figure 1A:
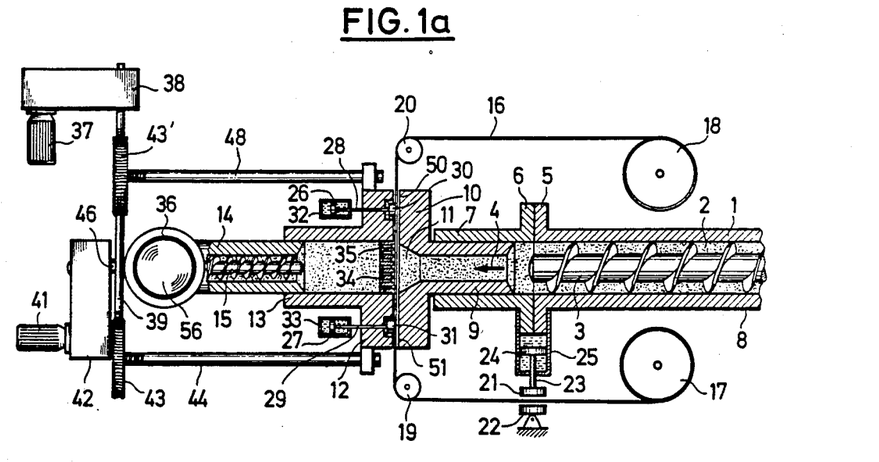
FIG. 1a is a part-sectional view of an apparatus according to a first preferred embodiment of the invention.

FIG. 1a is a diagrammatical representation of a first embodiment of the invention in which only the essential components are shown and all inessential parts are omitted. As shown, a transporting duct or tube 1 in which viscous material 2 consisting of molten scrap synthetic material, for example, is moved in the direction of arrow 4, under high pressure, by means of an extrusion-screw 3. The duct or tube 1 carries at one end a flange 5 facing the flange 6 of another tube 7. The other end 8 of tube 1 leads to a synthetic material supply unit (not shown). Another tube 9 is arranged displaceably in tube 7. The tube 9 which also performs the function of a transporting duct carries at one end a heavy flange 10 equipped with an expanded passage 11. Flange 10 abuts a counter-flange 12 of another sleeve or tube 13 enclosing an extrusion tube 14 containing an extrusion screw 15.

Running between flange 10 and counter-flange 12 is a strip-shaped cleaning screen 16 which is unwound from a first drum 17 and wound onto a second drum 18. The direction of winding may of course also be reversed, so that the cleaning screen is wound from drum 18 onto drum 17. The screen runs over two supporting rollers 19,20 and also passes through two brake-blocks 21,22, one of which is stationary and the other mobile. The mobile brake block 21 is connected to a piston rod 23 the other end of which is secured to a piston 24 moving in a cylinder 25. The mechanism which drives piston 24 is not shown, as it is only important that piston 24 can be moved within cylinder 25.

The same applies to two further pistons 26,27. Through piston rods 28,29 and pressure jaws 30,31, the pistons press screen-strip 16 to flange 10. Cylinders 32,33 which contain pistons 26,27 are shown here merely diagrammatically.

Facing expanded passage 11 in flange 10 is a perforated plate 34 comprising several through circular passages 35. The viscous synthetic material passes through these passages in the form of cylindrical ropes which come together again and are fed to extruder 15. The latter feeds the cleaned and still molten synthetic material to a device 36 where products such as foils or tubes can be produced. Thus the apparatus illustrated in FIG. 1 is not merely a synthetic material cleaning installation with a screening device, but also makes products from the cleaned synthetic material. Counter-flange 12 is connected through a shaft 48 to a drive which may consist, for example, of an electric motor 37, a gearbox 38 and a driving worm 39.

The electric motor also drives a shaft 44 and shafts 44,48 are therefore synchronized. Worm 39 drives gearwheels 43,43', each of which comprises a bore provided with teeth into which are inserted the shafts, at least the ends of which are in the form of spirals.

Motor 41 with gearbox 42 and extrusion shaft 46 (best seen in FIG. 1b) acts merely as a drive for the extrusion screw 15.

When the apparatus shown in FIG. 1 is in normal operation, the extrusion screw 3 presses the viscous and dirty synthetic material 2, under high pressure, against the strip-shaped cleaning screen 16, at the location of perforated plate 34.

The perforated plate 34 is formed integral with the counter flange 12 and thus absorbs the entire pressure force, thereby returning the pressure of the viscous material to atmospheric pressure. If the area of the cleaning screen which bears upon the perforated plate is dirty, it will be advanced by a drive located on drum 18 or drum 17, for example.

As described hereinafter, another drive is also possible but pressure jaws 30,31 must first be released. Otherwise, as soon as the jaws 30,31 are released, viscous synthetic material 2 would be forced out through gaps 50,51 and, in a relatively short time, the outer area would be filled with considerable quantities of synthetic material.

It is impossible to make the gaps 50,51 as narrow as one would like in order to provide sealing, since this would make it impossible to advance the strip-shaped cleaning screen 16. While the screen is being advanced, therefore gaps 50,51 are always relatively wide, and it would be possible for large quantities of synthetic material to escape.

In the apparatus according to the invention, the synthetic material is prevented from escaping by reducing the pressure of the molten synthetic material to almost zero at the area of contact between the perforated plate 34 and the cleaning screen 16. This produces a dual effect: on the one hand, the screen-strip 16 moves more easily and, on the other hand, no synthetic material escapes through gaps 50,51.

In order to achieve this pressure-reduction, counter-flange 12 and flange 10 with transporting duct or tube 9 are displaced in relation to the tube 7 in the direction of flow of the viscous material. The speed of this displacement is such that it corresponds to the flow-velocity of viscous synthetic material 2 at the end of the expanded passage 11. If this condition is fulfilled, there is no longer any excess pressure from the synthetic material to act upon cleaning screen 16, and, as soon as the pressure-jaws 30,31 are released, the screen 16 can be advanced.

As already described hereinbefore, the linear motion of counter-flange 12, flange 10 and tube 9 is effected by the drives 37 and 38.

These drives may, at the same time, be used for advancing the cleaning screen-strip 16. If during the linear movement of components 9,10,12, the brake-blocks 21,22 are closed, the cleaning screen-strip will be held at this location. This means that the screen-strip will be unwound from drum 17 and a clean area of the strip will now face the perforated plate. After this has taken place, brake-blocks 21,22 are released, pressure-jaws 30,31 are applied to the screen-strip 16, and unit 9,10,12 as a whole is again moved to the right towards extrusion screw 3.

Figure 1B:
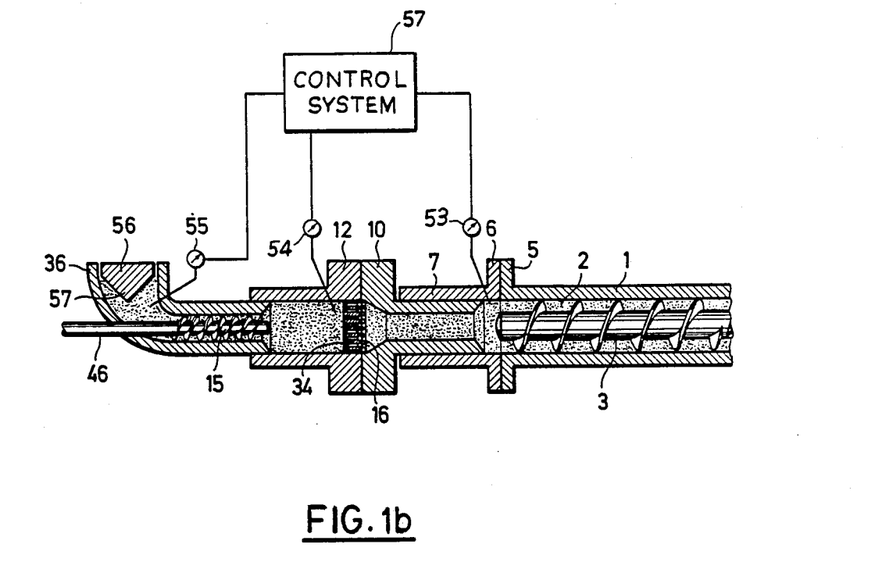
FIG. 1b is a view of the apparatus of FIG. 1, shown rotated through 90° about the longitudinal axis.

The apparatus illustrated in FIG. 1b is the same as that shown in FIG. 1a, except that it is rotated through 90° about the longitudinal axis of extrusion-screw 3. Moreover, three pressure indicators 53,54,55 are shown which measure and indicate pressures at particularly critical locations.

The screen-changing process can be fully automated by monitoring pressure ratios. A conventional control system, shown schematically as element 57 in FIG. 1b, is used to monitor and evaluate the measure pressures from indicators 53, 54 and 55. The pressure shown by pressure indicator 53, for example, is dependent upon the amount of dirt on screen 16. If the pressure exceeds a predetermined value, pressure jaws 30,31 may be released brake-block 21 may be actuated and motors 37,41 may be switched on all in response to appropriate signals from the control system 57.

Located at the end of the extrusion tube 36 is a mandrel 56 having a conical tip 57 which allows tubes of synthetic material, for example, to be produced.

Figure 2A:
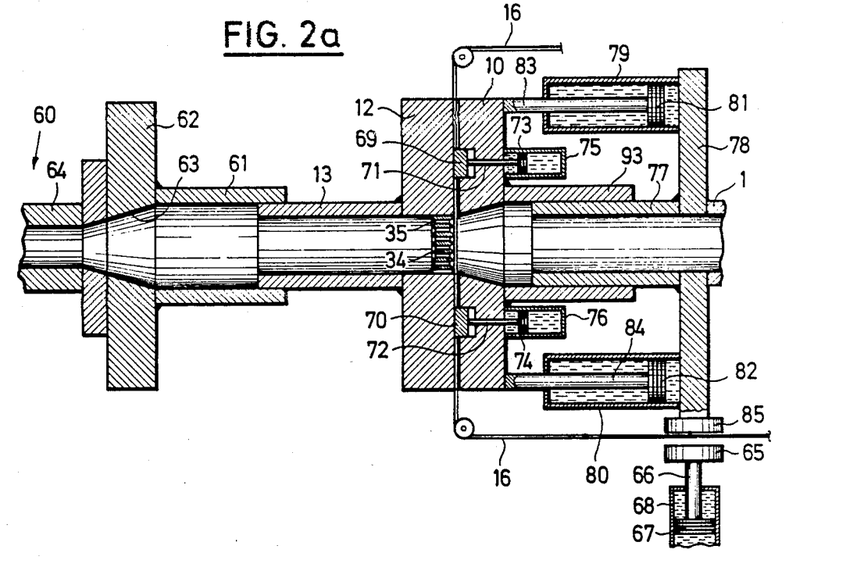
FIG. 2a is a view of an apparatus according to a second preferred embodiment of the invention, in the cleaning condition.

FIG. 2a shows another example embodiment according to the invention which may be used in a long line of machines in which several units are arranged consecutively, some of them being stationary. For example, if a stationary machine is located at point 60, linear movement of the apparatus according to the invention would be unsuitable since collisions would be unavoidable. In order to avoid this, tube 13 is arranged displaceably in a larger tube 61, the latter being connected to a flange 62 containing a conical passage 63 opening into a tube 64. If the flange 12 is moved to the left, flange 62, tube 64 and the machine unit may remain stationary at point 60.

In contrast to FIG. 1a, the cleaning screen-strip 16 is not halted by a mobile brake-block 21 which is in communication with tube 1. It is halted instead by a brake-block 65 which moves externally and is connected by a piston rod 66 to a piston 67 moving in a cylinder 68. The latter is connected to a stationary device (not shown).

Pressure-jaws 69,70 which press the screen-strip 16 against a flange are arranged on the side of flange 10 and press against flange 12. They are preferably hydraulically actuated through piston rods 71,72 connected to pistons 73,74 moving in cylinders 75,76.

Tube section 77 connected to tube 1 engages in sleeve 93 instead of surrounding it as in FIG. 1a. A flange 78 between tubes 1 and 77 carries cylinders 79,80 containing pistons 81,82 which are connected to flange 10 by piston rods 83,84. Components 79,80,81,82,83,84 together constitute a hydraulic drive which moves flange 78 towards or away from flange 10. In this case, no electric motors are required for this movement, as compared with FIG. 1a.

FIG. 2a shows the condition of the apparatus according to the invention in which screen-strip 16 is firmly clamped, whereas brake blocks 65,85 are open.

Figure 2B:
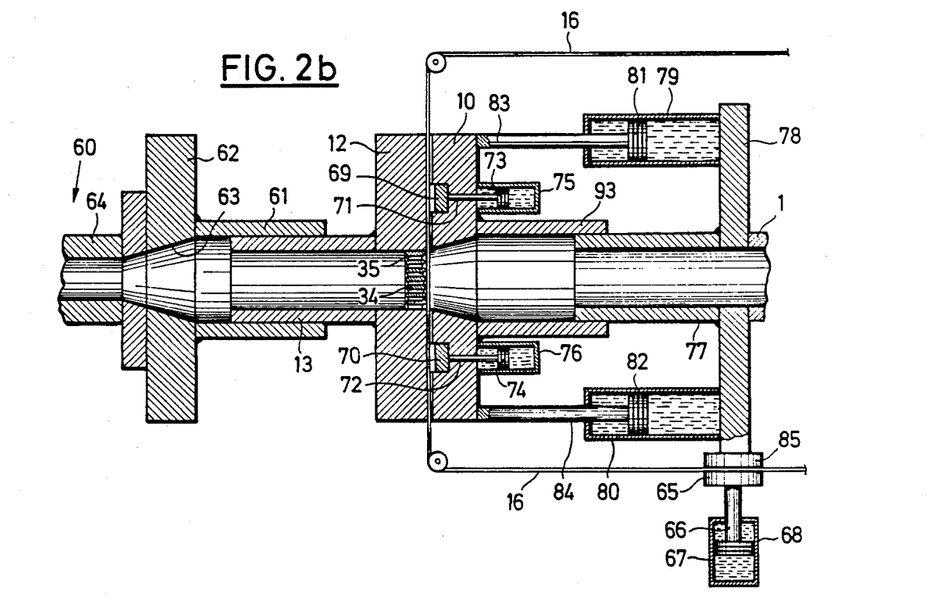
FIG. 2b shows the apparatus of FIG. 2 in the cleaning-strip-changing condition.

In FIG. 2b the conditions are precisely the reverse.

Thus, FIG. 2a shows the normal operating condition, whereas in FIG. 2b the cleaning screen-strip 16 is being advanced.

Figure 3:
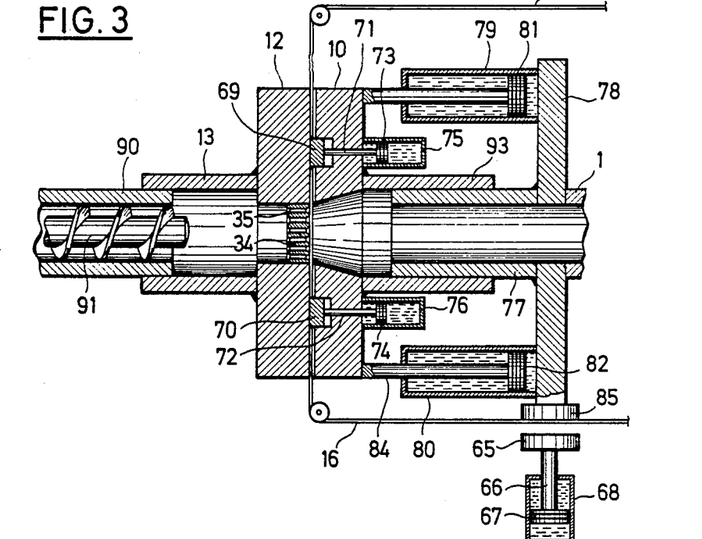
FIG. 3 is a view of an apparatus according to a third preferred embodiment of the invention, with an extruder screw at the outlet from the cleaning device.

The apparatus shown in FIG. 3 corresponds substantially to that shown in FIG. 2a. In this case, however, outlet tube or sleeve 13 surrounds an extrusion-tube 90 containing an extrusion screw 91.

Figure 4A:
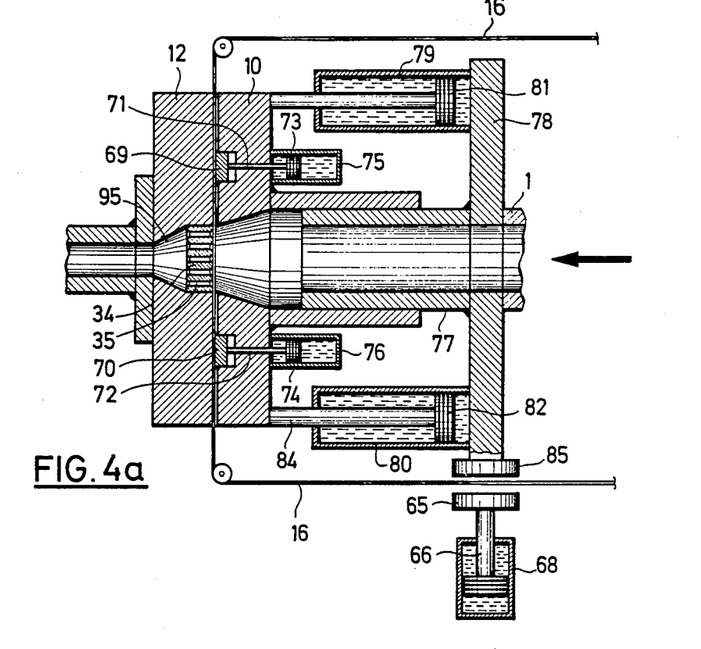
FIG. 4a is a view of an apparatus according to a fourth preferred embodiment of the invention with a perforated plate and a conical taper thereafter.

FIG. 4a shows another variant of the apparatus according to the invention. In this case, a conical taper 95 is arranged after perforated plate 34.

Figure 4B:
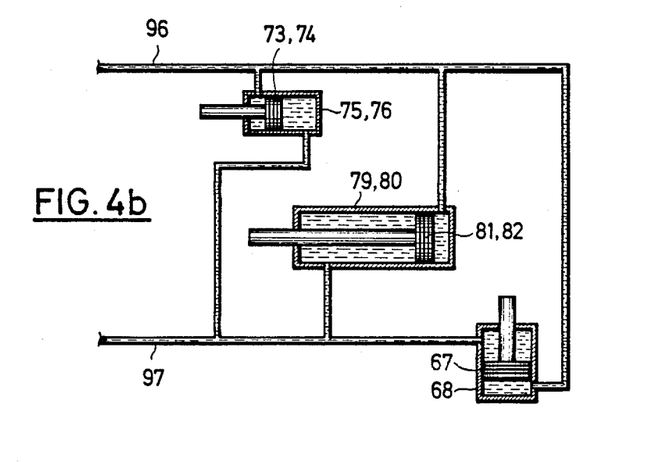
FIG. 4b shows a hydraulic diagram for a cleaning apparatus according to the invention.

FIG. 4b shows a simplified hydraulic diagram for this apparatus, comprising three different hydraulic devices 75,76,79,80 and 68.

All of these hydraulic devices are connected to the same hydraulic lines 96,97. If pressure is applied to line 96, pistons 73,74 move to the right and pistons 81,82 move to the left. At the same time, piston 67 moves upwardly. If, on the other hand, pressure is applied to line 97, pistons 73,74 move to the left, pistons 81,82 move to the right, and piston 67 moves downwardly.

It is to be understood that the drives may be of any known design, not only hydraulic or electrical.

It will also be appreciated that, with minor modifications, the invention may also be used for cleaning normal fluids such as water or acids.

Figure 5:
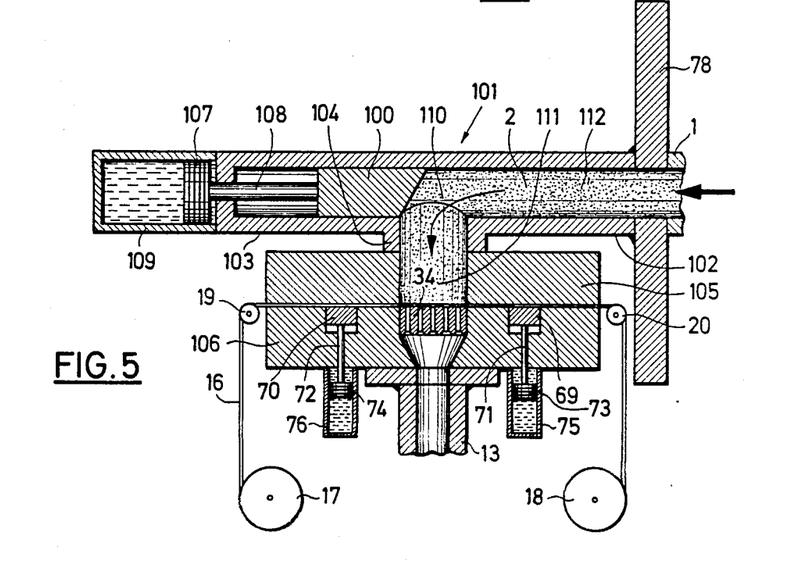
FIG. 5, which is on the same sheet of drawings as FIG. 3, is a view of an apparatus according to a fifth preferred embodiment of the invention, in which the cleaning screen does not move with the material to be cleaned.

FIG. 5 illustrates another variant of the invention in which the increase in volume is not obtained by moving cleaning screen-strip 16 in the direction of travel of material 2 to be cleaned. Actually, the cleaning screen-strip 16 is at all times stationary in relation to material 2. The increase in volume is obtained by means of a displaceable piston 100 arranged in a supply duct 101. The duct 101 has a front area 102 and a rear area 103, a duct 104 branching off between these two areas at point 110. In FIG. 5, duct 104 runs at right angles to duct 101, but it may also assume any other desired angle. Duct 104 continues in a flange 105 which faces another flange 106. The cleaning screen-strip 16 is arranged between flanges 105,106 in the usual manner.

If, in the area 103 of supply duct 101, piston 100 is moved from right to left, with the aid of a hydraulic piston 107 and a piston rod 108, the volume available for material 2 is enlarged and the pressure on the screen 16 is reduced. The front end of piston 100 is preferably sloped so that the front area 102 is not blocked off from branch duct 104 when the tip of the sloping end of the piston is over the end of the front area. If the dimensions of the piston rod 108 and housing 109 are appropriate, piston 100 may also be used to close off chamber 111 from chamber 112, by a movement from left to right.

The apparatus shown in FIG. 5 may easily be combined with an apparatus according to FIGS. 1 to 4b, and vice-versa. To this end, it is merely necessary to provide flange 106 with the drive described hereinbefore.

As it is apparent, in all of the embodiments of the invention illustrated, the volume is increased in front of the cleaning screen-strip i.e. where the soiled material is located, to provide a corresponding reduction in pressure.

The embodiments of the invention in which an exclusive property or privilege is claimed are defined as follows:

1. A method of cleaning viscous materials, wherein said viscous materials are passed in the molten condition under pressure through a movable strip-shaped screen having an upstream face which retains impurities, comprising the following steps:
   a. reducing the pressure of the viscous material against the upstream face of said strip-shaped screen when the latter is obstructed by the impurities it retains;
   b. temporarily eliminating the sealing pressure between the strip-shaped screen and a first chamber which feeds the molten material through the strip-shaped screen and a second chamber which receives the filtered molten material;
   c. moving said strip-shaped screen crossways with respect to the direction of flow of said viscous material to replace a soiled area of the screen by a clean area;
   d. immobilizing the strip-shaped screen;
   e. resealing the first chamber, screen and second chamber together, the molten material upstream of said screen being simultaneously repressurized; and
   f. continuing to filter material through said strip-shaped screen;
wherein the reduction of the pressure of the viscous material is achieved by increasing the original volume of said first chamber supplying the molten material to said strip-shaped screen, and repressurization of the viscous material is accomplished by restoring the first chamber to its original volume.

2. A method according to claim 1, wherein the pressure of the viscous material is reduced to atmospheric pressure.

3. An apparatus for cleaning viscous materials, comprising:
   a. a housing comprising means defining a gap;
   b. means for supplying soiled viscous material to said housing;
   c. means for receiving cleaned viscous material from said housing;
   d. a cleaning screen in the form of a strip through which viscous material is pressed, said screen being at least partly arranged within said housing and being movable through said gap of said housing;
   e. means for moving said screen transversally with respect to the direction of the flow of the viscous material for replacement of a soiled area of the screen by a clean area;
   f. means for hermetically sealing said gap with respect to the viscous material during the process of cleaning said viscous material and for opening said gap during the movement of the strip-shaped screen; and
   g. means for increasing the volume in front of the strip-shaped screen where soiled viscous material is located, to provide a corresponding reduction of pressure of the viscous material against said strip-shaped screen when said strip-shaped screen is moved.

4. An apparatus according to claim 3, wherein said means for increasing the volume comprises means for displacing the area of the strip-shaped screen which is acted upon by the viscous material in the direction of flow of said viscous material to provide said volume increase.

5. An apparatus according to claim 4, wherein brake means are provided for retaining said strip-shaped screen as said area thereof is moved in the direction of flow of said viscous material.

6. An apparatus according to claim 3, wherein said means for increasing the volume comprises a piston arranged in the path of flow of said viscous material upstream of said strip-shaped screen, said piston being movable to provide said volume increase.

7. An apparatus according to claim 6 wherein said means for supplying viscous material comprises a first transporting duct, said first transporting duct essentially comprising two sections running at right angles to each other, said piston being arranged to move along the axis of one of said sections.

8. An apparatus according to claim 3, wherein said means for supplying viscous material comprises a first transporting duct and wherein said means for receiving cleaned viscous material comprises a second transporting duct, said first transporting duct being movable relative to said second transporting duct.

9. An apparatus according to claim 8, wherein said first and second transporting ducts engage each other telescopically.

10. An apparatus according to claim 8, wherein said housing comprises first and second flanges, said first flange being integral with said first transporting duct.

11. An apparatus according to claim 10, wherein pressure devices are provided for pressing said strip-shaped screen against said first flange.

12. An apparatus according to claim 10, wherein two hydraulic pressure lines are provided, one of said lines running to a first chamber of pressure-cylinders operatively connected to said first flange and the other line running to a second chamber of said pressure-cylinders.

13. An apparatus according to claim 8, wherein an extrusion screw is provided in said second transporting duct.

14. An apparatus according to claim 8, wherein said first transporting duct comprises an expanded passage in the vicinity of said strip-shaped screen.

15. An apparatus according to claim 8, further comprising means for displacing said housing relative to said second transporting duct.

16. An apparatus according to claim 15, wherein said displacing means is located between said housing and said second transporting duct whereby said means displaces said housing in parallel with the axis of said second transporting duct.

17. An apparatus according to claim 16, wherein said housing comprises first and second flanges, the first flange being secured to said first transporting duct.

18. An apparatus according to claim 17, wherein the second flange is connected to a perforated plate arranged downstream of said strip-shaped screen, said second flange being secured to a sleeve surrounded by a third transporting duct.

19. An apparatus according to claim 17, wherein said second flange is connected to a perforated plate arranged downstream of said strip-shaped screen, said second flange being secured to a sleeve surrounding another sleeve containing a conveying device.

20. An apparatus according to claim 17, wherein the second flange is connected to a perforated plate arranged downstream of said strip-shaped screen and the second flange comprises a conical taper behind said perforated plate.

21. An apparatus according to claim 3, in which a portion of said strip-shaped screen abuts against a perforated plate.

22. An apparatus according to claim 21, wherein said perforated plate is formed with circular perforations.

23. An apparatus according to claim 3, wherein said means for moving said screen comprises means for unwinding said strip-shaped screen from a first drum and for winding said strip-shaped screen onto a second drum.

24. An apparatus according to claim 23, wherein guide rollers are provided over which said strip-shaped screen passes.

25. An apparatus according to claim 3, wherein motor and gear means are provided for moving said housing for said strip-shaped screen.

26. An apparatus according to claim 3, wherein said means for receiving cleaned viscous material includes a downstream extrusion screw.

27. An apparatus according to claim 3, wherein pressure-measuring devices are provided for measuring the pressure of said viscous material at one or more locations.

28. An apparatus according to claim 27, wherein means for evaluating the measure pressures are provided.

29. An apparatus according to claim 3, wherein pressure-jaws are provided to press the strip-shaped screen against a flange arranged downstream of said strip-shaped screen.

30. An apparatus according to claim 3, wherein the area of said strip-shaped screen which is acted upon by the viscous material is movable in the direction of flow of said viscous material, and in which a piston is provided in the path of flow of said viscous material upstream of said strip-shaped screen, said piston being movable away from the direction of flow of the viscous material, said movable screen portion and piston providing said volume increase.

* * * * *